(12) United States Patent
Newman et al.

(10) Patent No.: US 8,395,374 B2
(45) Date of Patent: Mar. 12, 2013

(54) LINEAR POSITION SENSOR

(75) Inventors: Robert Newman, Edwardsburg, MI (US); William Storrie, Motherwell (GB)

(73) Assignee: CTS Corporation, Elkhart, IN (US)

( * ) Notice: Subject to any disclaimer, the term of this patent is extended or adjusted under 35 U.S.C. 154(b) by 483 days.

(21) Appl. No.: 12/315,332

(22) Filed: Dec. 2, 2008

(65) Prior Publication Data
US 2009/0140730 A1 Jun. 4, 2009

Related U.S. Application Data

(60) Provisional application No. 61/005,147, filed on Dec. 3, 2007, provisional application No. 61/010,230, filed on Jan. 7, 2008.

(51) Int. Cl.
*G01B 7/14* (2006.01)
(52) U.S. Cl. .................................................. 324/207.24
(58) Field of Classification Search .............. 324/207.24
See application file for complete search history.

(56) References Cited

U.S. PATENT DOCUMENTS

| | | | |
|---|---|---|---|
| 2,134,072 A | 10/1938 | Christensen |
| 2,355,721 A | 8/1944 | Foutz |
| 2,478,575 A | 8/1949 | Fitch |
| 2,738,808 A | 3/1956 | Hartzell et al. |
| 2,849,091 A | 8/1958 | Newell |
| 2,939,486 A | 6/1960 | Demay |
| 2,976,686 A | 3/1961 | Stelzer |
| 3,082,792 A | 3/1963 | Jenkins et al. |
| 3,136,227 A | 6/1964 | Williams |
| 3,397,621 A | 4/1968 | Groves |
| 3,509,795 A | 5/1970 | Woodward |
| 3,575,088 A | 4/1971 | Bauer |
| 3,648,571 A | 3/1972 | Burgess |
| 3,859,619 A | 1/1975 | Ishihara et al. |
| 3,911,793 A | 10/1975 | Izumi |
| 4,005,639 A | 2/1977 | Welsh |
| 4,056,043 A | 11/1977 | Sriramamurty et al. |
| 4,070,946 A | 1/1978 | Sandvik et al. |
| 4,088,977 A | 5/1978 | Bowman, Jr. et al. |
| 4,128,044 A | 12/1978 | Larson et al. |
| 4,230,077 A | 10/1980 | Ito |
| 4,237,076 A | 12/1980 | Benjamin |
| 4,256,019 A | 3/1981 | Braddick |

(Continued)

FOREIGN PATENT DOCUMENTS

| CA | 2635228 | 6/2007 |
|---|---|---|
| DE | 7424147 | 10/1974 |

(Continued)

OTHER PUBLICATIONS

Melexis (Microelectronic Integrated Systems) MLX90316 Rotary Position Sensor IC Data Sheet Dated Sep. 20, 2005, pp. 1-34, Melexis NV, Ieper, Belgium.

(Continued)

*Primary Examiner* — Reena Aurora
(74) *Attorney, Agent, or Firm* — Daniel J. Deneufbourg; Mark P. Bourgeois

(57) ABSTRACT

A sensor used to sense the position of an attached movable object. The sensor can be mounted to a pneumatic actuator. The sensor includes a housing that has a pair of cavities or pockets separated by a wall. A magnet carrier is positioned within one of the cavities and a magnet is coupled to the magnet carrier. The magnet carrier is coupled to the moveable object. A magnetic sensor is positioned in the other of the cavities. The magnetic sensor generates an electrical signal that is indicative of a position of the movable object.

10 Claims, 11 Drawing Sheets

U.S. PATENT DOCUMENTS

| | | | |
|---|---|---|---|
| 4,282,800 A | 8/1981 | Young et al. |
| 4,283,679 A | 8/1981 | Ito et al. |
| 4,312,319 A | 1/1982 | Brakebill |
| 4,377,070 A | 3/1983 | Shadbourne |
| 4,403,538 A | 9/1983 | Rise |
| 4,437,386 A | 3/1984 | Baumgartner |
| 4,462,359 A | 7/1984 | Muller |
| 4,478,107 A | 10/1984 | Buannec |
| 4,502,847 A | 3/1985 | Pozniak et al. |
| 4,543,790 A | 10/1985 | Coll et al. |
| 4,642,603 A | 2/1987 | Martinez, Jr. |
| 4,733,214 A | 3/1988 | Andresen |
| 4,746,772 A | 5/1988 | Bovee et al. |
| 4,756,229 A | 7/1988 | Drakeley |
| 4,761,608 A | 8/1988 | Franklin et al. |
| 4,805,744 A | 2/1989 | Pringle |
| 4,809,657 A | 3/1989 | Sejimo et al. |
| 4,850,263 A | 7/1989 | Rumsey et al. |
| 4,857,842 A | 8/1989 | Sturman et al. |
| 4,915,018 A | 4/1990 | Scott et al. |
| 5,016,523 A | 5/1991 | Bowyer |
| 5,177,370 A | 1/1993 | Meister |
| 5,226,312 A | 7/1993 | Gautier et al. |
| 5,226,347 A | 7/1993 | Gautier et al. |
| 5,270,645 A | 12/1993 | Wheeler et al. |
| 5,293,811 A | 3/1994 | Delair et al. |
| 5,487,273 A | 1/1996 | Elpem et al. |
| 5,570,015 A | 10/1996 | Takaishi et al. |
| 5,727,447 A | 3/1998 | Shiraishi et al. |
| 5,771,774 A | 6/1998 | Stojic |
| 5,811,968 A | 9/1998 | Nakazawa et al. |
| 5,955,881 A | 9/1999 | White et al. |
| 6,018,241 A | 1/2000 | White et al. |
| 6,057,682 A | 5/2000 | McCurley et al. |
| 6,105,927 A | 8/2000 | Zelczer et al. |
| 6,155,048 A | 12/2000 | Vertanen |
| 6,164,187 A | 12/2000 | Stojic |
| 6,175,233 B1 | 1/2001 | McCurley et al. |
| 6,189,435 B1 | 2/2001 | Vertanen et al. |
| 6,255,941 B1 | 7/2001 | Osterman et al. |
| 6,289,602 B1 | 9/2001 | Chiddister |
| 6,304,078 B1 | 10/2001 | Jarrard et al. |
| 6,349,629 B1 | 2/2002 | Plantan et al. |
| 6,352,137 B1 | 3/2002 | Stegall et al. |
| 6,356,811 B1 | 3/2002 | Beselt |
| 6,360,649 B1 | 3/2002 | Plantan |
| 6,369,689 B1 | 4/2002 | Osmer et al. |
| 6,417,768 B2 | 7/2002 | Osterman et al. |
| 6,501,375 B1 | 12/2002 | Weant et al. |
| 6,526,866 B2 | 3/2003 | Pisoni et al. |
| 6,536,329 B2 | 3/2003 | Anderson et al. |
| 6,536,469 B2 | 3/2003 | Dilger et al. |
| 6,564,554 B2 | 5/2003 | Hercey et al. |
| 6,633,157 B1 * | 10/2003 | Yamaki et al. | 324/207.2 |
| 6,662,708 B2 | 12/2003 | Hosny |
| 6,690,158 B2 | 2/2004 | Saito et al. |
| 6,748,848 B1 | 6/2004 | Riley et al. |
| 6,752,171 B1 | 6/2004 | Kemmler et al. |
| 6,888,451 B1 | 5/2005 | Plantan |
| 6,968,742 B2 | 11/2005 | Rodenhauser et al. |
| 6,988,443 B2 | 1/2006 | Morris |
| 7,014,016 B2 | 3/2006 | Morris et al. |
| 7,044,444 B2 | 5/2006 | Haubold et al. |
| 7,194,946 B2 | 3/2007 | Bacardit |
| 7,199,578 B2 | 4/2007 | Rohner et al. |
| 7,219,691 B2 | 5/2007 | Gethmann et al. |
| 7,340,895 B2 | 3/2008 | Noelle |
| 7,387,080 B2 | 6/2008 | Andronic |
| 7,423,421 B2 | 9/2008 | Reichert et al. |
| 7,439,732 B2 | 10/2008 | LaPlaca |
| 7,451,690 B2 | 11/2008 | Schrader et al. |
| 7,454,979 B2 | 11/2008 | Frank et al. |
| 7,570,047 B2 | 8/2009 | Stuve et al. |
| 7,762,220 B2 | 7/2010 | Okanovic et al. |
| 7,823,385 B2 | 11/2010 | McEwen et al. |
| 7,852,067 B2 | 12/2010 | Schmid et al. |
| 7,946,555 B2 | 5/2011 | Ikeda |
| 2003/0030958 A1 | 2/2003 | Saito et al. |
| 2004/0250678 A1 | 12/2004 | Bonotto et al. |
| 2005/0061144 A1 | 3/2005 | Schall |
| 2005/0087067 A1 | 4/2005 | Vermoesen et al. |
| 2007/0257219 A1 | 11/2007 | Perrin |
| 2008/0230328 A1 | 9/2008 | Lacroix et al. |
| 2009/0139587 A1 | 6/2009 | Spliethoff et al. |
| 2009/0140730 A1 | 6/2009 | Newman et al. |
| 2009/0205332 A1 | 8/2009 | Baeuerle et al. |
| 2009/0206846 A1 | 8/2009 | Sanchez et al. |
| 2010/0127697 A1 | 5/2010 | Storrie et al. |
| 2011/0079138 A1 | 4/2011 | Storrie et al. |
| 2011/0247484 A1 | 10/2011 | Klesbauer et al. |
| 2011/0262266 A1 | 10/2011 | Rakod et al. |
| 2011/0308897 A1 | 12/2011 | Wallace et al. |

FOREIGN PATENT DOCUMENTS

| | | |
|---|---|---|
| DE | 29 23 644 | 12/1979 |
| DE | 100 59 337 | 6/2001 |
| DE | 10 2005 013442 | 9/2006 |
| DE | 10 2005 029904 | 1/2007 |
| DE | 10 2006 021 129 | 6/2007 |
| DE | 10 2006 021 127 | 8/2007 |
| DE | 10 2008 030503 | 1/2009 |
| DE | 10 2008 01170 | 9/2009 |
| DE | 10 2009 032958 | 1/2011 |
| DE | 20 2011 03003 | 4/2011 |
| EP | 96408 | 12/1983 |
| EP | 261537 | 3/1988 |
| EP | 0 738 892 | 10/1996 |
| EP | 1 182 461 | 2/2002 |
| EP | 1 701 015 | 9/2006 |
| EP | 1 884 636 | 2/2008 |
| EP | 1 972 916 | 9/2008 |
| EP | 2 068 061 | 6/2009 |
| EP | 2 161 460 | 3/2010 |
| EP | 2 208 893 | 7/2010 |
| EP | 2 199 565 | 1/2011 |
| EP | 1 852 588 | 5/2011 |
| EP | 1 852 587 | 6/2011 |
| EP | 1 852 586 | 9/2011 |
| GB | 2256050 | 11/1992 |
| GB | 2261472 | 5/1993 |
| GB | 2322164 | 8/1998 |
| GB | 2468779 | 9/2010 |
| JP | 05 264326 | 10/1993 |
| WO | WO03/093769 A1 | 11/2003 |
| WO | WO 2009/073170 | 6/2009 |

OTHER PUBLICATIONS

CTS Corporation, EGR history with poti sensors (2011), 7 pages, Elkhart, Indiana.

Woco Industrietechnik GmbH, Woco Actuators, www.wocogroup.com (2011), 1 page, Bad Soden-Salmünster, Germany.

SMK, SMK Actuators, www.smk-systeme.de (2011), 2 pages, Filderstadt, Germany.

Padmini VNA Mechatronics Pvt. Ltd., Padmini EGR/Secondary AIR Injection, www.padminivna.com (2009), 1 page, Gurgaon, India.

Padmini VNA Mechatronics Pvt. Ltd., Padmini Actuator, www.padminivna.com (2009), 1 page, Gurgaon, India.

CTS Automotive Products, product brochure for 586 Series Non-Contacting, 2-Piece Linear Position Sensor (2009), 2 pages, Elkhart, Indiana.

CTS Corporation, CTS 569 Turbo Sensor, Exploded views and Cross Section Detail (2011), 4 pages, Elkhart, Indiana.

CTS Automotive Products, product brochure for 569 Series High Temperature Linear Position Sensor (2007), 2 pages, Elkhart, Indiana.

CTS Automotive Products, product brochure for 537 Series Linear EGR Sensor (2007), 2 pages, Elkhart, Indiana.

INZI Controls Company, INZI Vacuum Actuators, www.inzicontrols.devu.kr (2007), 3 pages, Kyunggi-do, Korea.

* cited by examiner

LINEAR POSITION SENSOR

CROSS REFERENCE TO RELATED AND CO-PENDING APPLICATIONS

This application claims the benefit of the filing date and disclosure of U.S. Provisional Patent Application Ser. No. 61/005,147, filed on Dec. 3, 2007 and U.S. Provisional Patent Application Ser. No. 61/010,230, filed on Jan. 7, 2008, the contents of which are entirely incorporated herein by reference as are all references cited therein.

FIELD OF THE INVENTION

This invention relates, in general, to position sensors. More particularly, this invention relates to a linear position sensor that can be used with an actuator to generate a signal indicating positional information.

BACKGROUND OF THE INVENTION

Position sensing is used to electronically monitor the position or movement of a mechanical component. The position sensor produces an electrical signal that varies as the position of the component in question varies. Electrical position sensors are included in many products. For example, position sensors allow the status of various automotive components to be monitored and controlled electronically.

A position sensor needs to be accurate, in that it must give an appropriate electrical signal based upon the position measured. If inaccurate, a position sensor may hinder the proper evaluation and control of the position of the component being monitored.

Typically, it is also a requirement that a position sensor be adequately precise in its measurement. However, the precision needed in measuring a position will obviously vary depending upon the particular circumstances of use. For some purposes, only a rough indication of position is necessary; for instance, an indication of whether a valve is mostly open or mostly closed. In other applications, more precise indication of position may be needed.

A position sensor should also be sufficiently durable for the environment in which it is placed. For example, a position sensor used on an automotive valve may experience almost constant movement while the automobile is in operation. Such a position sensor should be constructed of mechanical and electrical components adequate to allow the sensor to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers that produce electrical signals which vary as a function of the component's position. Contacting position sensors are generally accurate and precise. Unfortunately, the wear due to contact during movement has limited their durability. Also, the friction resulting from the contact can degrade the operation of the component. Further, water intrusion into a potentiometric sensor can disable the sensor.

One advancement in sensor technology has been the development of non-contacting position sensors. A non-contacting position sensor ("NPS") does not require physical contact between the signal generator and the sensing element. Instead, an NPS utilizes magnets to generate magnetic fields that vary as a function of position, and devices to detect varying magnetic fields to measure the position of the component to be monitored. Often, a Hall Effect device is used to produce an electrical signal that is dependent upon the magnitude and polarity of the magnetic flux incident upon the device. The Hall Effect device may be physically attached to the component to be monitored and thus moves relative to the stationary magnet(s) as the component moves. Conversely, the Hall Effect device may be stationary with the magnet(s) affixed to the component to be monitored. In either case, the position of the component to be monitored can be determined by the electrical signal produced by the Hall Effect device.

The use of an NPS presents several distinct advantages over the use of a contacting position sensor. Because an NPS does not require physical contact between the signal generator and the sensing element, there is less physical wear during operation, resulting in greater sensor durability. The use of an NPS is also advantageous because the lack of any physical contact between the items being monitored and the sensor itself results in reduced drag.

While the use of an NPS presents several advantages, there are also several disadvantages that must be overcome in order for an NPS to be a satisfactory position sensor for many applications. Magnetic irregularities or imperfections can compromise the precision and accuracy of an NPS. The accuracy and precision of an NPS can also be affected by the numerous mechanical vibrations and perturbations likely to be experienced by the sensor. Because there is no physical contact between the item to be monitored and the sensor, it is possible for them to be knocked out of alignment by such vibrations and perturbations. A misalignment can result in the measured magnetic field at any particular location not being what it would be in the original alignment. Because the measured magnetic field can be different than that when properly aligned, the perceived position can be inaccurate. Linearity of magnetic field strength and the resulting signal is also a concern.

Magnetic position sensors of the prior art also require special electronics to account for changes in the magnetic field with temperature. The field generated by a magnet changes with temperature and the sensor must be able to differentiate between changes in temperature and changes in position.

SUMMARY OF THE INVENTION

It is a feature of the present invention to provide a linear position sensor.

It is another feature of the present invention to provide a sensor for sensing the position of a movable object. The sensor includes a housing that has a pair of cavities or pockets separated by a wall. A magnet carrier is positioned in one of the cavities and a magnet is coupled to the magnet carrier. The magnet carrier is coupled to the moveable object. A magnetic sensor is positioned in the other of the cavities. The magnetic sensor generates an electrical signal that is indicative of a position of the movable object.

An additional feature of the present invention is to provide an actuator and sensor assembly that includes an actuator housing and a sensor housing coupled to the actuator housing. The actuator housing and the sensor housing define at least one chamber. A piston is mounted in the chamber. A shaft is coupled to the piston and extends from the actuator housing. A sensor is mounted in a pocket defined by the sensor housing. The sensor is adapted to sense the position of the shaft.

It is noted that the drawings of the invention are not to scale.

DETAILED DESCRIPTION OF EMBODIMENTS

Figure 1:
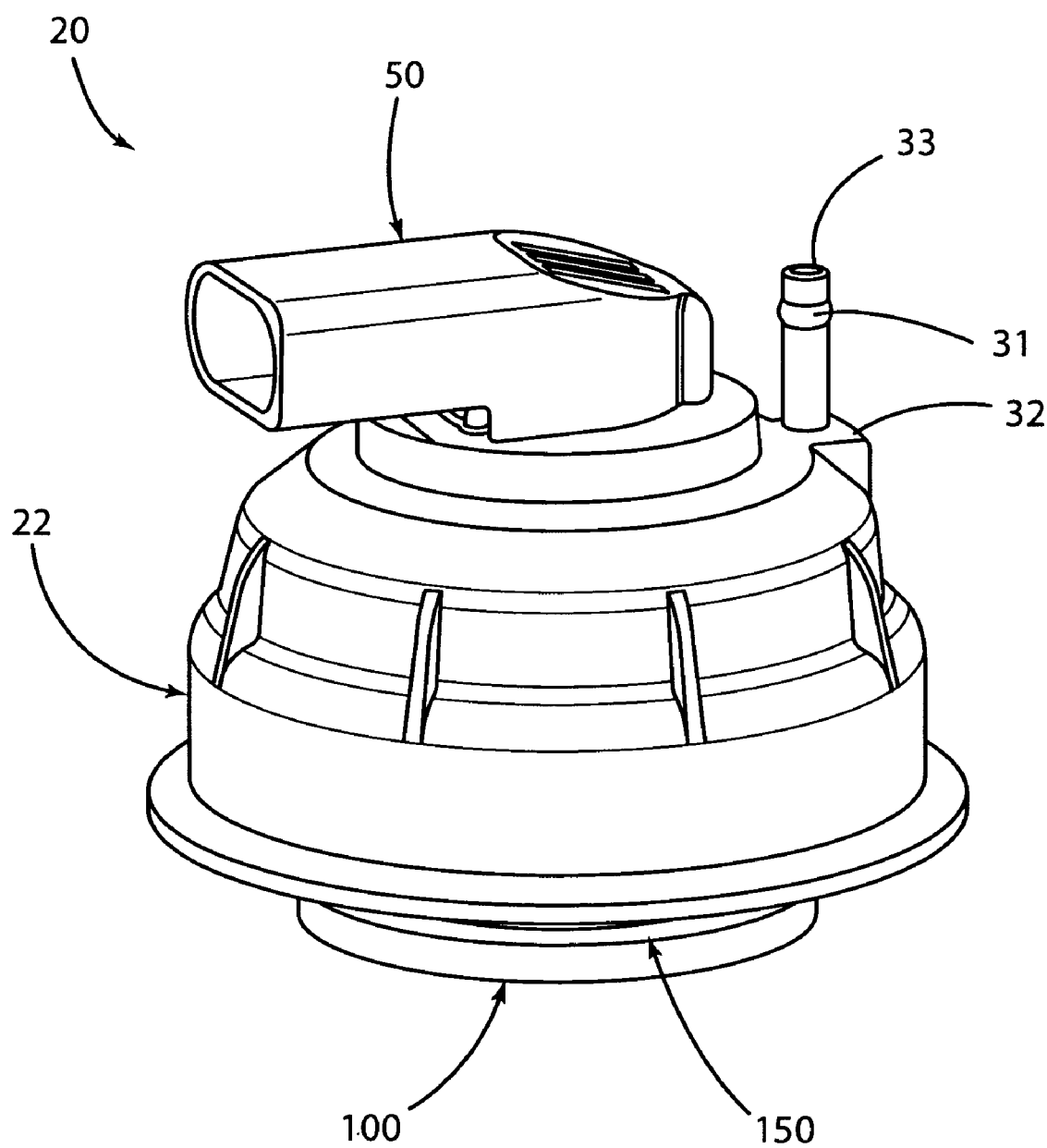
FIG. 1 is an overall perspective view of a linear position sensor in accordance with the present invention.
Figure 2:
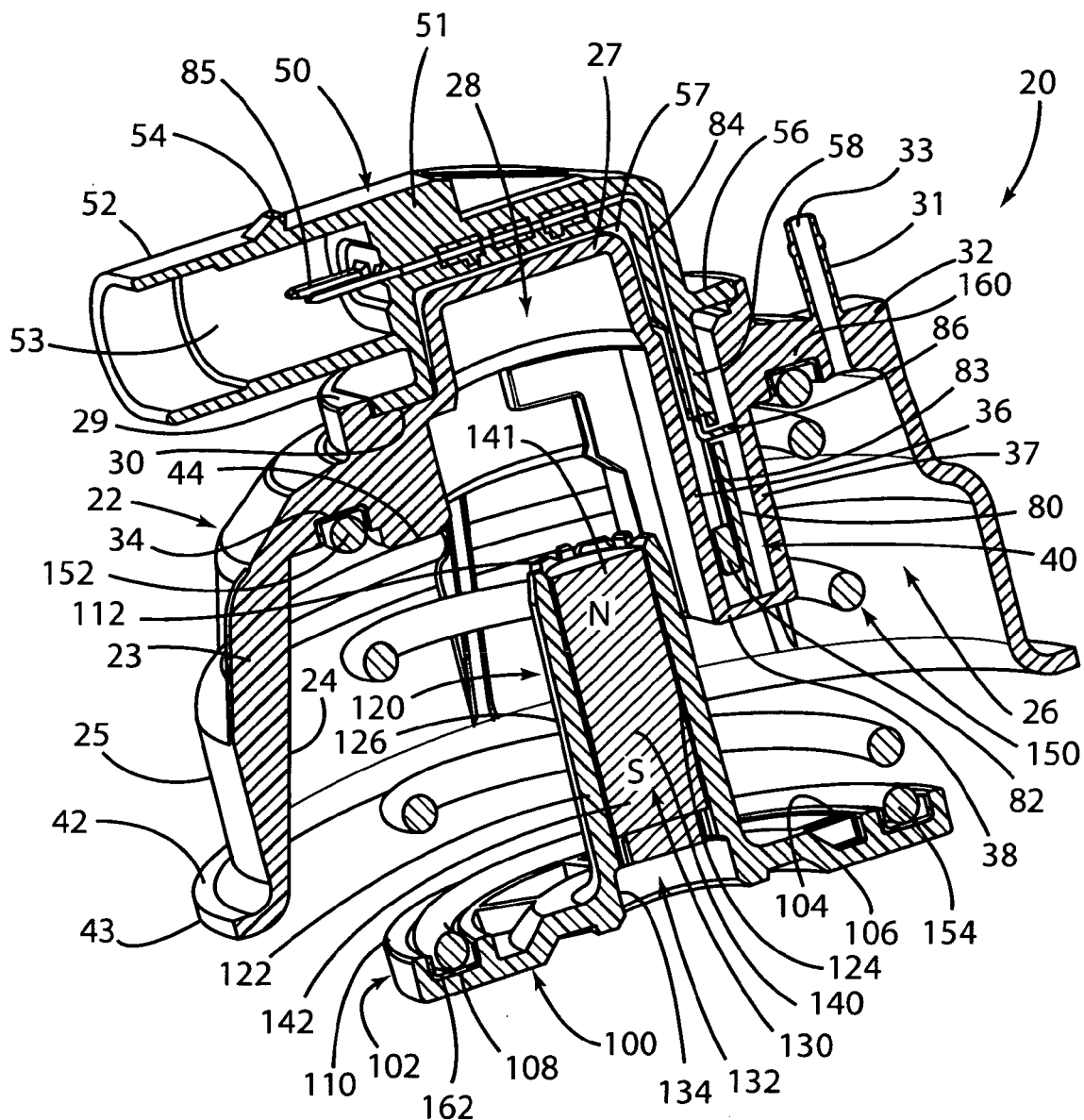
FIG. 2 is a vertical cross-sectional view of the linear position sensor shown in FIG. 1.

A linear position sensor assembly 20 in accordance with the present invention is shown in FIGS. 1 and 2. Linear position sensor 20 can sense the position of a moveable object that travels in a linear manner. Linear position sensor 20 includes a housing 22, a magnet carrier 100, and a spring 150 that biases the magnet carrier 100 away from housing 22.

Housing or cover 22 is generally circular and dome-shaped and comprises a downwardly circumferentially extending dome-shaped exterior wall 23 that has an inner surface 24 and an outer surface 25. Wall 23 defines an interior sensor cavity or chamber or pocket or compartment 26.

Housing 22 further comprises a rounded top or roof portion 27 and a rounded bottom or flange portion 42. Top portion 27 defines an interior bore or cavity 28 that is co-axial with and opens into cavity 26. Housing 22 further defines a circular recess 30 that is located between an outer circular rim 29 and a wall of top portion 27. Rim 29 extends upwardly from the top of wall 23. A boss 32 extends from one side of wall 23 and has a tube 31 extending outwardly therefrom in a relationship that is generally parallel with bore 28. A port or passage 33 is defined in and extends through tube 31 and boss 32, such that tube 31 and cavity 26 are in fluid communication. Tube 31 can be connected to a source of pneumatic fluid such as air.

A round shoulder 44 extends downwardly into cavity 26 from an upper portion of wall 23. A circular or circumferential recess or groove 34 that faces downwardly into cavity 26 is defined between shoulder 44 and wall 23. An elongated wall 36 extends downwardly from one side of top portion 27 into cavity 26 parallel with bore 28 and towards bottom portion 42. Another elongated diametrically opposed wall 37 extends downwardly from one side of wall 23 into cavity 26 parallel with wall 36 and towards bottom portion 42. A bottom wall or floor 38 connects walls 36 and 37 in a relationship normal to walls 36 and 37.

Walls 36, 37, and 38 of housing 22 define an interior printed circuit board cavity or pocket or compartment or chamber 40. A rim 43 is defined about the circumference of bottom portion 42. In one embodiment, housing 22 can be formed from injected molded plastic.

Housing 22 further comprises a connector portion 50 mounted over top portion 27. Connector portion 50 includes a body 51 and a shroud 52 that extends from body 51 in a direction generally normal to the axis of bore 28. A cavity 53 is defined inside shroud 52 and a locking tab 54 is located on an exterior surface of shroud 52. An electrical connector (not shown) is adapted to be mounted over shroud 52 and retained to the shroud 52 by locking tab 54. The electrical connector may be connected with a wire harness.

Connector portion 50 further comprises a circular annular flange 56 that extends downwardly from body 51. Flange 56 is seated in recess 30 of housing 22. Connector portion 50 can be attached to recess 30 in housing 22 by heat staking or ultrasonically welding the flange 56 and the rim 29 together. Body 51 further defines a round interior cavity 57 which allows the connector 50 to be mounted over the top portion 27 of housing 22. Connector portion 50 also has an arm 58 that extends downwardly partially into printed circuit board cavity 40 when connector 50 is mounted over housing 22.

Several electrically conductive generally L-shaped terminals 84 can be insert-molded into body 51. Terminals 84 are retained by, and pass through, body 51 and arm 58. Terminals 84 define respective opposed ends 85 and 86. Terminal end 86 extends into printed circuit board cavity 40 and is attached to printed circuit board 80 by press-fitting or soldering or wire-bonding and the other terminal end 85 extends into cavity 53. Terminal end 85 is adapted for connection to an electrical connector (not shown).

Printed circuit board 80 is mounted in printed circuit board cavity or pocket 40. Printed circuit board 80 can be a conventional printed circuit board formed from FR4 material. A sensor 82 is mounted to printed circuit board 80. Sensor 82 can be a magnetic field sensor such as a Hall Effect device. In one embodiment, sensor 82 is an integrated circuit from Melexis Corporation of Ieper, Belgium adapted to measure the magnetic field in two directions or vectors parallel to the integrated circuit surface and adapted to include internal Hall Effect devices. Other electronic components such as capacitors, resistors, inductors and other signal conditioning components can also be mounted to printed circuit board 80.

One or more printed circuit lines 83 are located on circuit board 40 and electrically connect the sensor 82 to terminal end 86.

Magnet carrier 100 is mounted for movement within interior cavity 26 and bore 28 of housing 22. Magnet carrier 100 has a circular circumferentially extending annular base 102. Base 102 has a top portion or face 104 and a bottom portion or face 106. An annular recess 108 is formed in the top portion 104 and faces cavity 26. A circumferentially extending lip 110 protrudes upwardly from the peripheral edge of the top portion 104 of base 102.

Magnet carrier 100 further comprises a generally circumferentially-shaped tube 120 that extends centrally upwardly from the top portion 104 of base 102 in a relationship generally normal to base 102. Tube 120 is defined by a circumferential wall 122 that has an inside surface 124 and an outside surface 126. The inside surface 124 defines an elongate magnet bore 130 in tube 120. A circular counter bore 132 is defined in base 102 and faces outwardly from bottom portion 106 and is in communication with the bore 132. Counter bore 132 is defined by base interior central wall 134.

An elongated generally cylindrical magnet 140 can be mounted in magnet bore 130. Magnet 140 can be inserted into magnet bore 130 and held in place with a heat stake 112 located at one end of tube 120. Alternatively, magnet 140 may be press fit or overmolded into magnet bore 130.

Magnet 140 can be a permanent magnet that is polarized to define a north pole 141 and a south pole 142. Magnet 140 can be made from several different magnetic materials such as, but not limited to, ferrite or samarium cobalt or neodymium-iron-boron. In one embodiment, magnet 140 can be a neodymium-iron boron magnet that is cylindrical in shape. Other types and shapes of magnets may also be used.

A first circular U-shaped metal clip ring 160 is press fit into recess 34 of housing 22 and a second circular U-shaped metal clip ring 162 is press fit into recess 108 of magnet carrier 100. Coil spring 150 is disposed within cavity 26 between housing 22 and magnet carrier 100. Circular coil spring 150 has ends 152 and 154. End 152 is press fitted into, and retained by, metal clip 160 and end 154 is press fitted into, and retained by, metal clip 162. Spring 150 surrounds tube 120, magnet 140 and sensor 82. Spring 150 further surrounds wall 37 and housing pocket 40. The pocket 40 is thus located between magnet carrier tube 120 and the spring 150.

Spring 150 biases magnet carrier 100 away from housing 22. Spring 150 is oriented such that spring 150 can be compressed and depressed along the axis of movement of magnet carrier 100.

Figure 3:
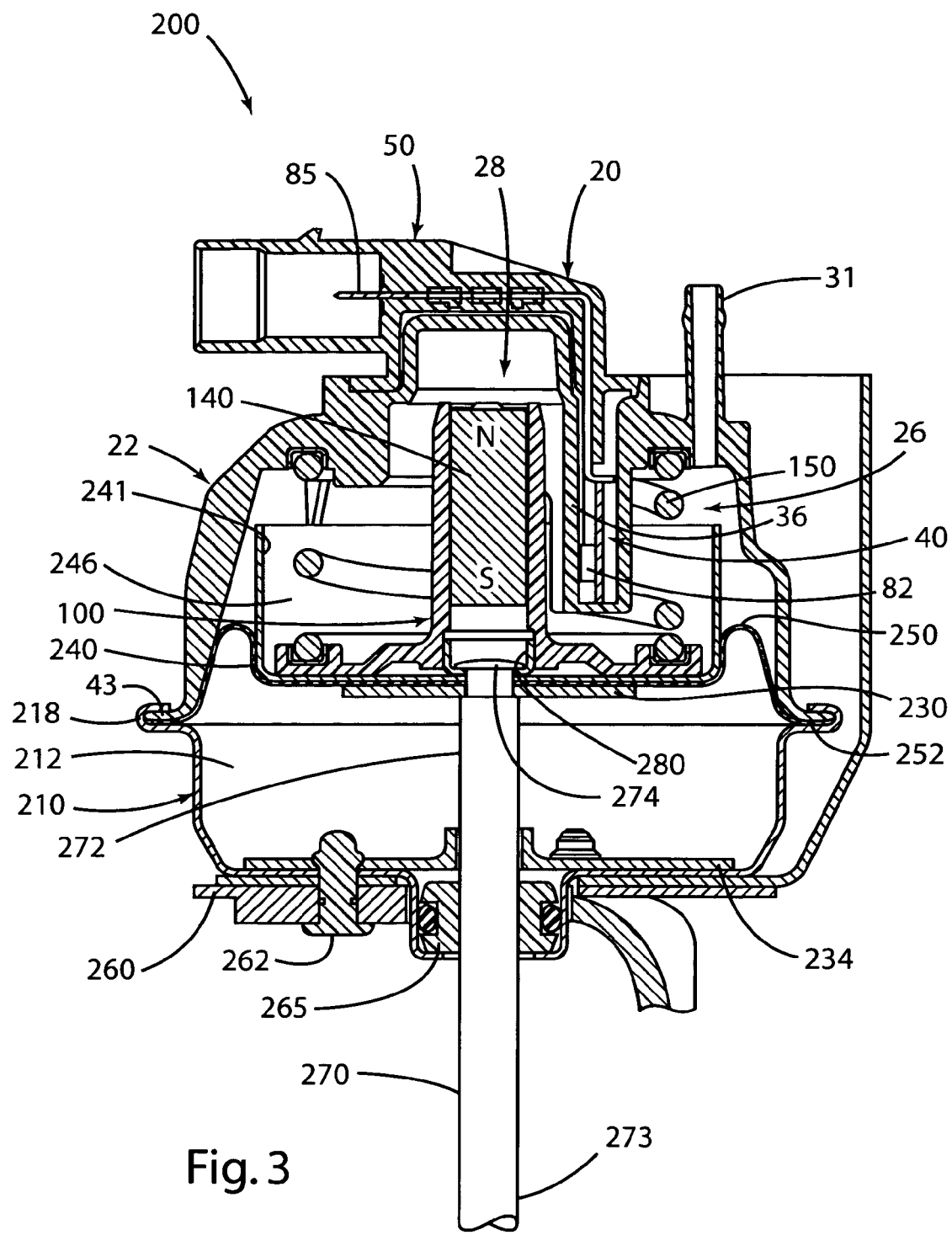
FIG. 3 is a vertical cross-sectional view of the linear position sensor of FIG. 1 assembled with an actuator.
Figure 4:
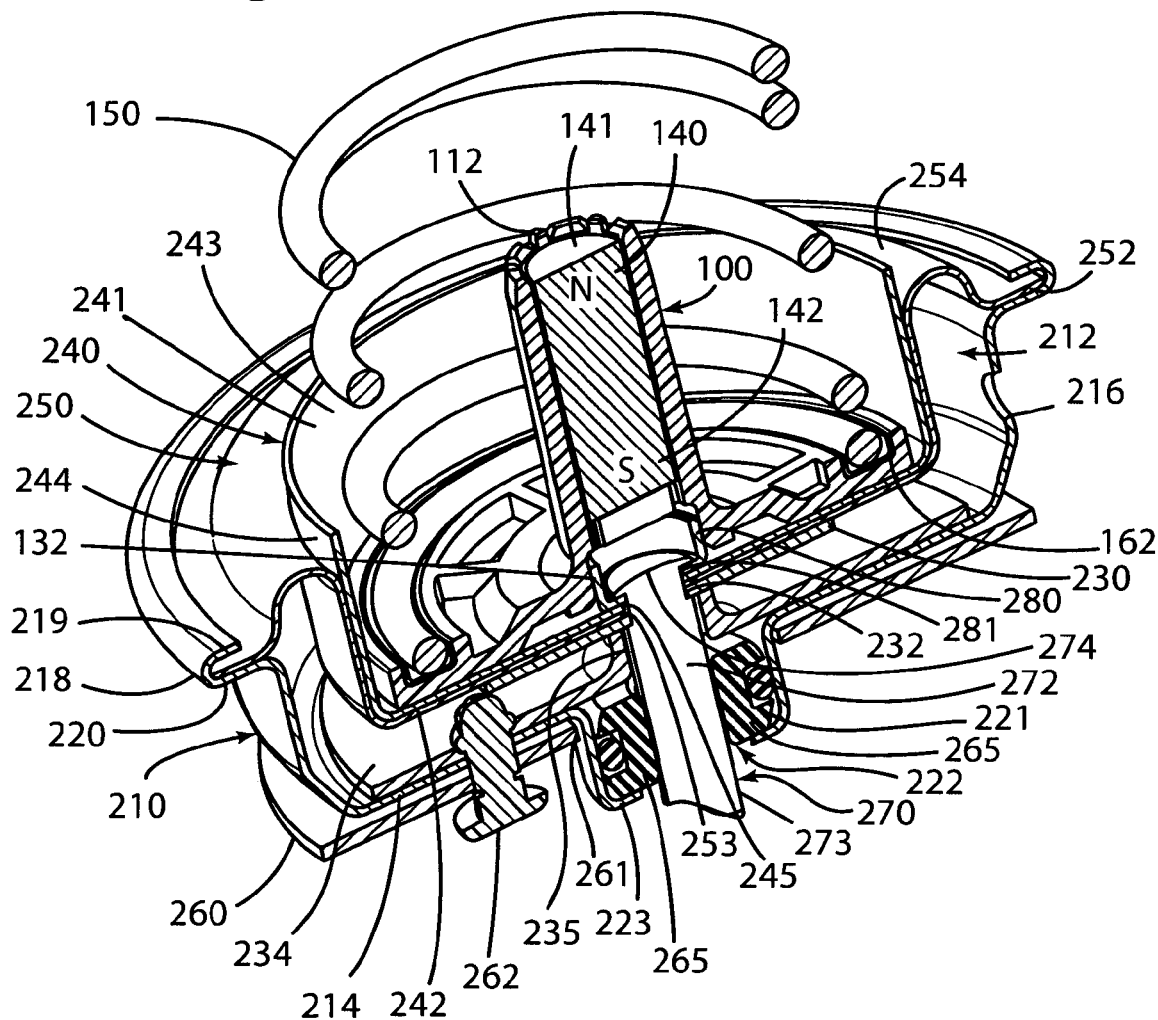
FIG. 4 is an enlarged vertical cross-sectional view of a magnet carrier and actuator piston showing the attachment of the magnet carrier to a valve shaft.
Figure 5:
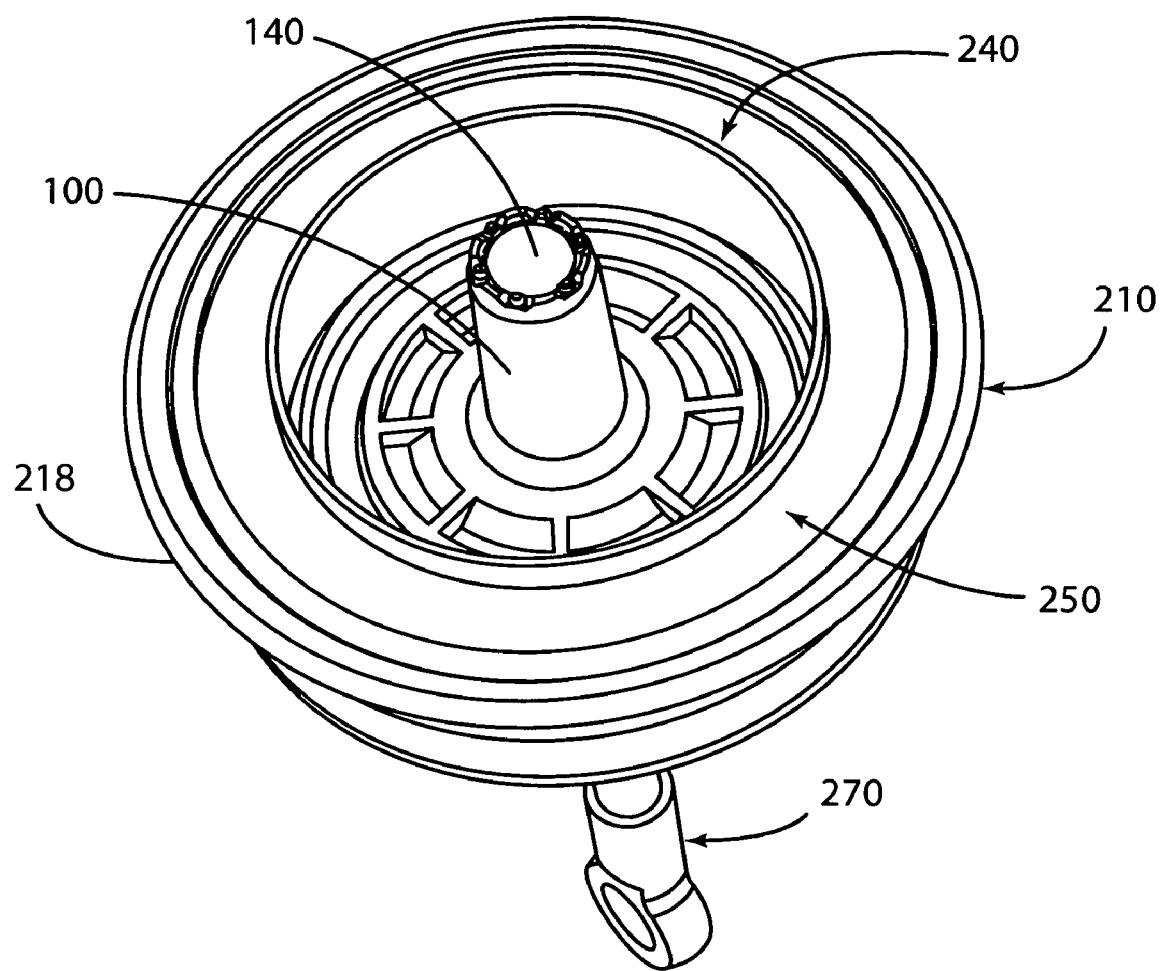
FIG. 5 is a top perspective view of an actuator housing.

A pneumatic actuator assembly 200 is shown in FIGS. 3-5 which incorporates the previously described linear position sensor 20 mounted to a lower actuator housing 210.

Lower actuator housing 210 is generally circular in shape and includes a bottom wall or floor 214 and a side wall 216 (FIG. 4). Walls 214 and 216 define an interior cavity 212. An upper portion of side wall 216 is bent over to form a circumferentially extending sleeve or clip 218 with a C-shaped cross-section. Sleeve 218 has an upper side or surface 219 and a lower side or surface 220. A generally cylindrically-shaped boss 223 extends downwardly from bottom wall 214 and defines an interior recess 221. An aperture 222, defining an entry into the recess 221, is defined through the bottom and center of boss 223.

A piston or plunger 240 is disposed within cavity 212 of housing 210. Piston 240 has a circumferential side wall 241 including inside surface 243 and an outside surface 244 and a bottom annular well or floor 242. Walls 241 and 242 define an interior piston cavity, recess or chamber 246. Piston 240 is mounted for motion within cavities 212 and 26. Recess 246 faces housing 22 of position sensor 20. A central hole or aperture 245 is defined in bottom plunger wall 242. Piston 240 is adapted for movement within cavities 26 and 212.

A circular plate 230 is mounted adjacent to and below bottom wall 242. A central aperture 232 is defined in plate 230. Another circular plate 234 is mounted between a bracket 260 and plate 230. Plate 234 defines a central aperture 235.

Bracket 260 defines a central hole or aperture 261. Bracket 260 can be fastened to a vehicle engine or engine component such as a turbocharger (not shown). Boss 223 extends through hole 261. A bearing 265 is located in recess 221 and supports shaft 270. Bracket 260 supports lower actuator housing 210. Lower actuator housing 210 is connected to bracket 260 by a fastener 262.

Shaft 270 defines opposed ends 272 and 273. A generally mushroom-shaped crown 274 is defined at end 272. Shaft 270 can be attached to any type of object. For example, shaft 270 may be attached to a by-pass or waste gate valve of a turbocharger that is attached to an engine.

Shaft 270 extends successively through aperture 222, bearing 265, aperture 235, aperture 243, aperture 245 and into counter bore 132. A circular metal bucket 280 is mounted in counter bore 132. Bucket 280 is press fit into counter bore 132 such that bucket 280 is in contact with wall 134. Shaft 270 extends through aperture 281 of bucket 280. Crown 274 has a larger diameter than aperture 281 thereby retaining crown 274 to bucket 280. Crown 274 may be formed by reforming end 272.

Flexible rubber boot 250 is circular in shape and defines an outer edge 252, an aperture 253, and a flexible section 254 (FIG. 4). Flexible rubber boot 250 can be formed from a wide variety of flexible or resilient materials such as, for example, rubber or plastic and is coupled to and surrounds and supports piston 240. Flexible rubber boot 250 surrounds side wall 241 and bottom wall 242 and is further held between plate 230 and bottom wall 242. The outer edge 252 is crimped into sleeve 218 between walls 219 and 220 and allows piston 240 to move within cavities 26 and 212 (FIG. 3).

Housing 22 is also retained to lower actuator housing 210 by crimping in sleeve 218. Rim 43 and outer edge 252 (FIG. 3) are crimped into sleeve 218 between walls 219 and 220 to form an airtight seal. Flexible rubber boot 250 creates two sealed upper and lower cavities or chambers 26 and 212 respectively.

In accordance with the present invention, linear position sensor assembly 20 can be used to ascertain the position of a moveable object such as shaft 270 that is moved by actuator assembly 200. Shaft 270 can be connected with a wide variety of objects including turbo-charger bypass or waste gate valves.

Figure 6:
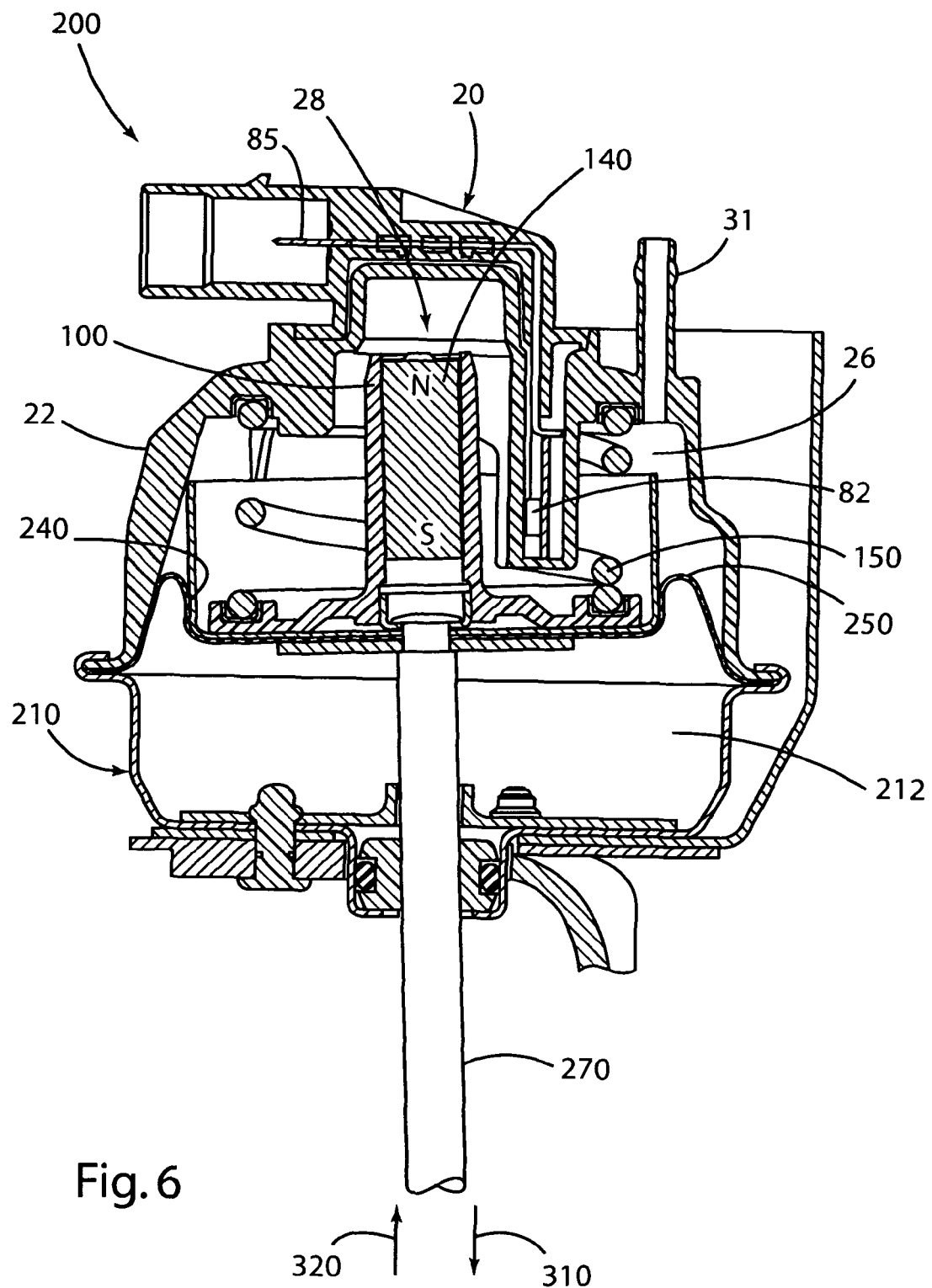
FIG. 6 is another vertical cross-sectional view of the linear position sensor of FIG. 3 with the valve shaft in a retracted position.

FIG. 6 depicts actuator assembly 200 with shaft 270 in a retracted position. Tube 31 can be connected to a source of vacuum such as an engine intake manifold or vacuum tank (not shown). When vacuum is increased through tube 31 into cavity 26, piston 240 is forced to move upwardly in a linear direction 310 and retract shaft 270. The air pressure within cavity 212 is either relatively constant or decreased such that, when air pressure is increased within cavity 26, piston 240 moves away from housing 22. In FIG. 6, spring 150 is in a compressed position.

Figure 7:
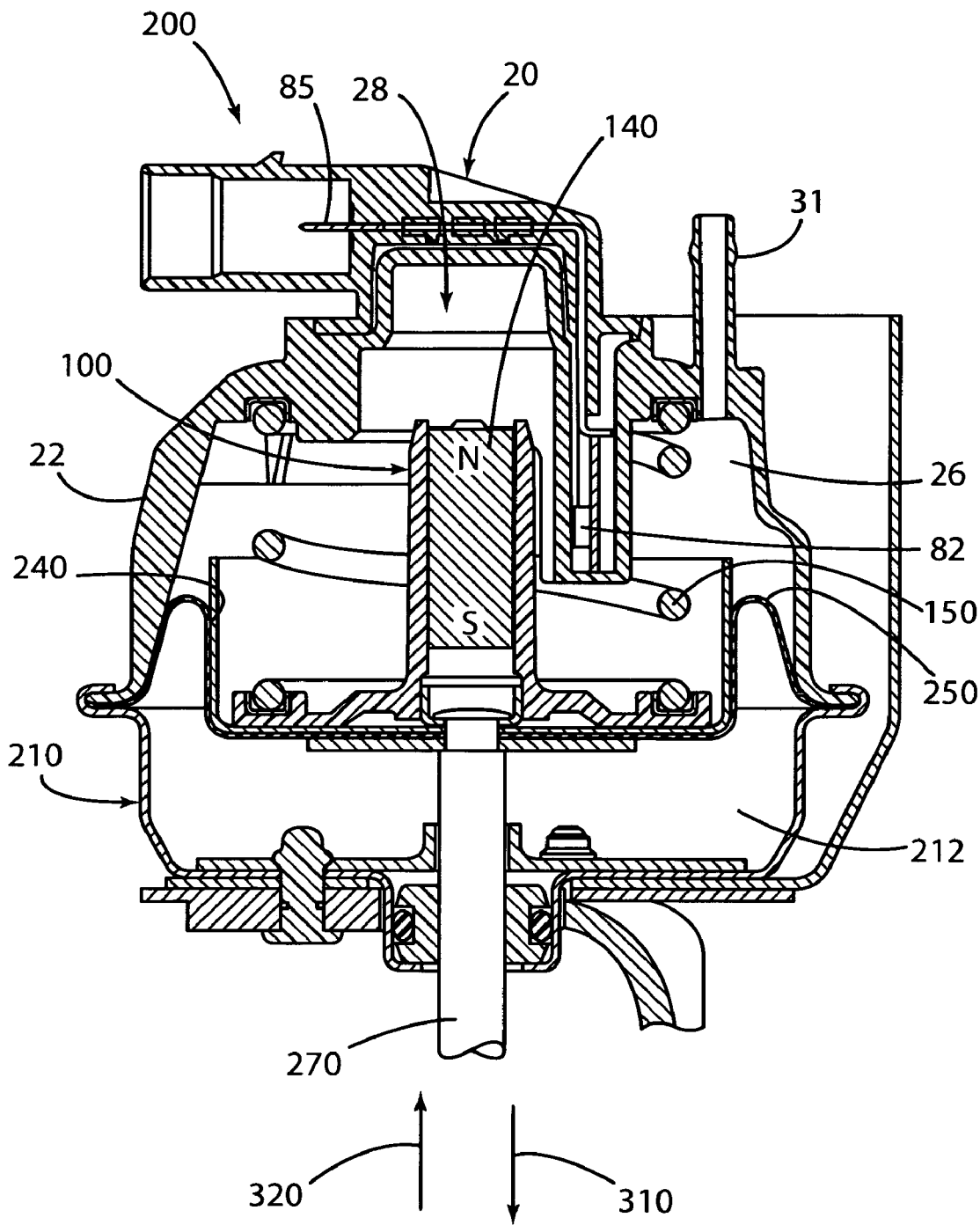
FIG. 7 is a further vertical cross-sectional view of the linear position sensor of FIG. 3 with the valve shaft in an intermediate position.

As the vacuum applied through tube 31 is decreased, piston 240 moves to a middle or intermediate position as shown in FIG. 7.

Figure 8:
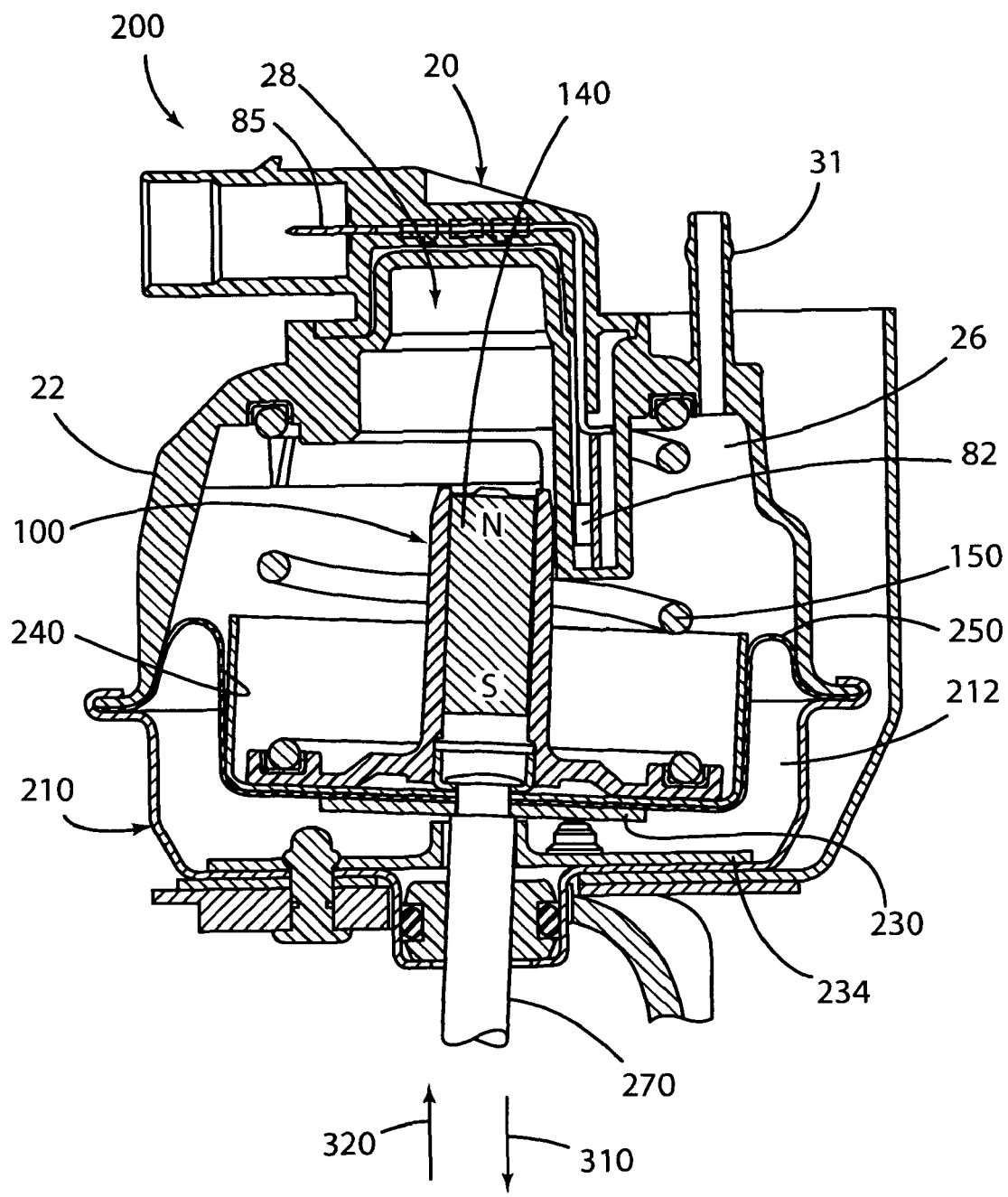
FIG. 8 is yet another vertical cross-sectional view of the linear position sensor of FIG. 3 with the valve shaft in an extended position.

FIG. 8 shows actuator assembly 200 with shaft 270 in its extended position. When vacuum is further decreased through tube 31 into cavity 26, piston 240 continues to move downwardly in a linear direction 310 until plate 230 abuts plate 234 (FIG. 3). In FIG. 8, spring 150 is in an extended position.

When vacuum is increased through tube 31 into cavity 26, piston 240 reverses its direction of movement and moves upwardly in direction 320 retracting shaft 270.

At the same time that piston 240 is moving, magnet carrier 100 and magnet 140 are also moving linearly within bore 28 (FIGS. 2 and 8) with respect to Hall Effect sensor 82 that is fixed within printed circuit board cavity 40. Sensor 82 is spaced, and separated, from magnet 140 by housing wall 36. The magnetic field produced by magnet 140 passes through wall 36 where the magnitude and direction of the magnetic field is sensed by sensor 82. As magnet 140 moves linearly, north pole 141 and south pole 142 change position relative to sensor 82 thus creating a change in the magnitude and direction of the magnetic field. The changes in direction and magnitude of the magnetic field can be sensed about two axes by sensor 82.

Sensor 82 produces an electrical signal that changes in response to the position of magnet 140 and thereby also the position of shaft 270. The electrical signal produced by sensor 82 is indicative of the position of magnet 140 and piston 240. As the magnetic field generated by the magnet 140 varies with movement of the shaft, the electrical output signal produced by sensor 82 changes accordingly, allowing the position of shaft 270 to be determined.

The present invention has several advantages. The mounting of the movable mechanical components (magnet carrier and magnet) in a separate cavity or pocket apart from the electronic components such as the sensor allows the electronic components to be better isolated and protected and sealed from outside environmental conditions. This allows the sensor to be used in more demanding applications which may include high heat and humidity.

First Alternative Embodiment

Figure 9:
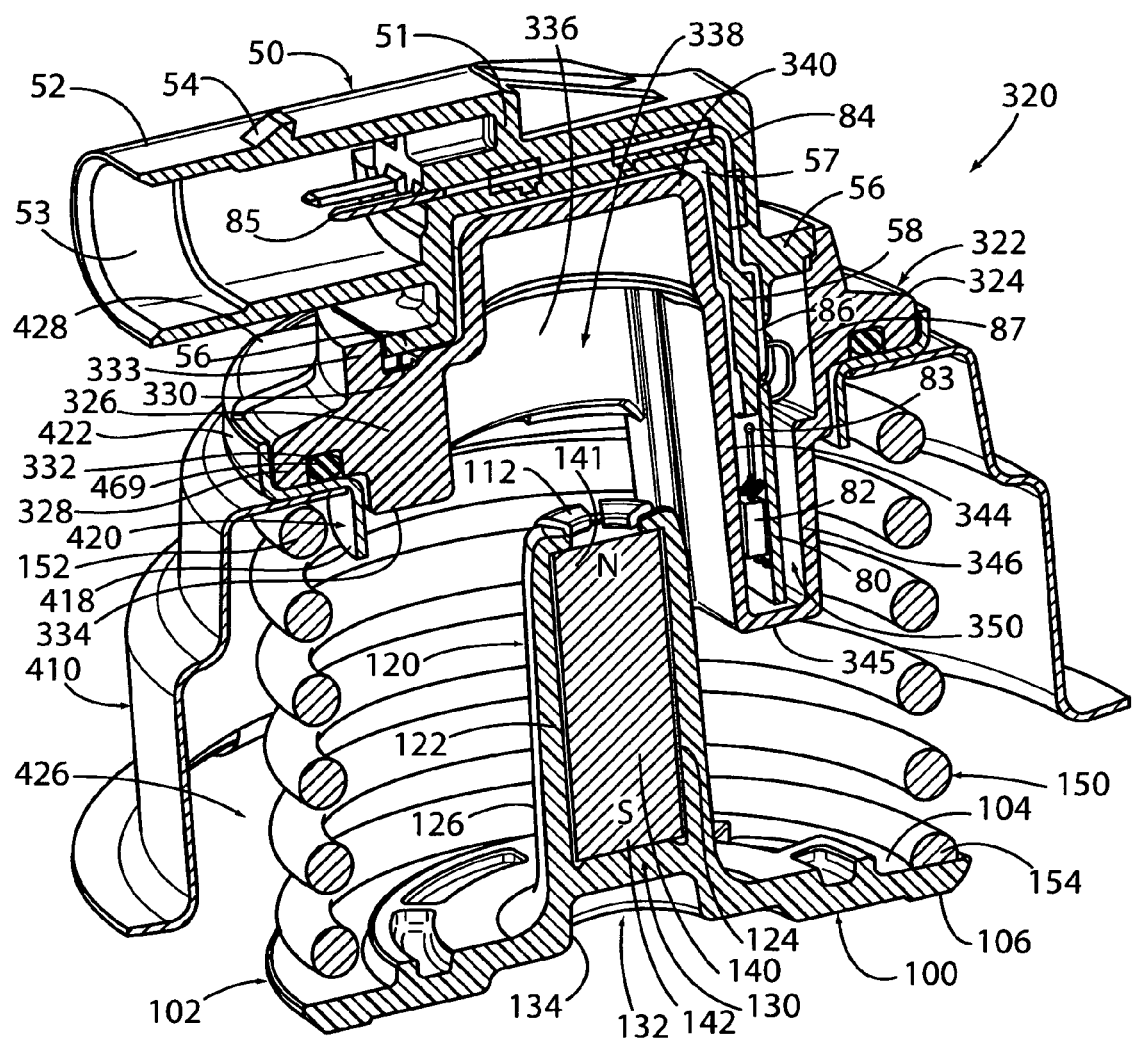
FIG. 9 is a perspective vertical cross-sectional view of another embodiment of a linear position sensor in accordance with the present invention.
Figure 10:
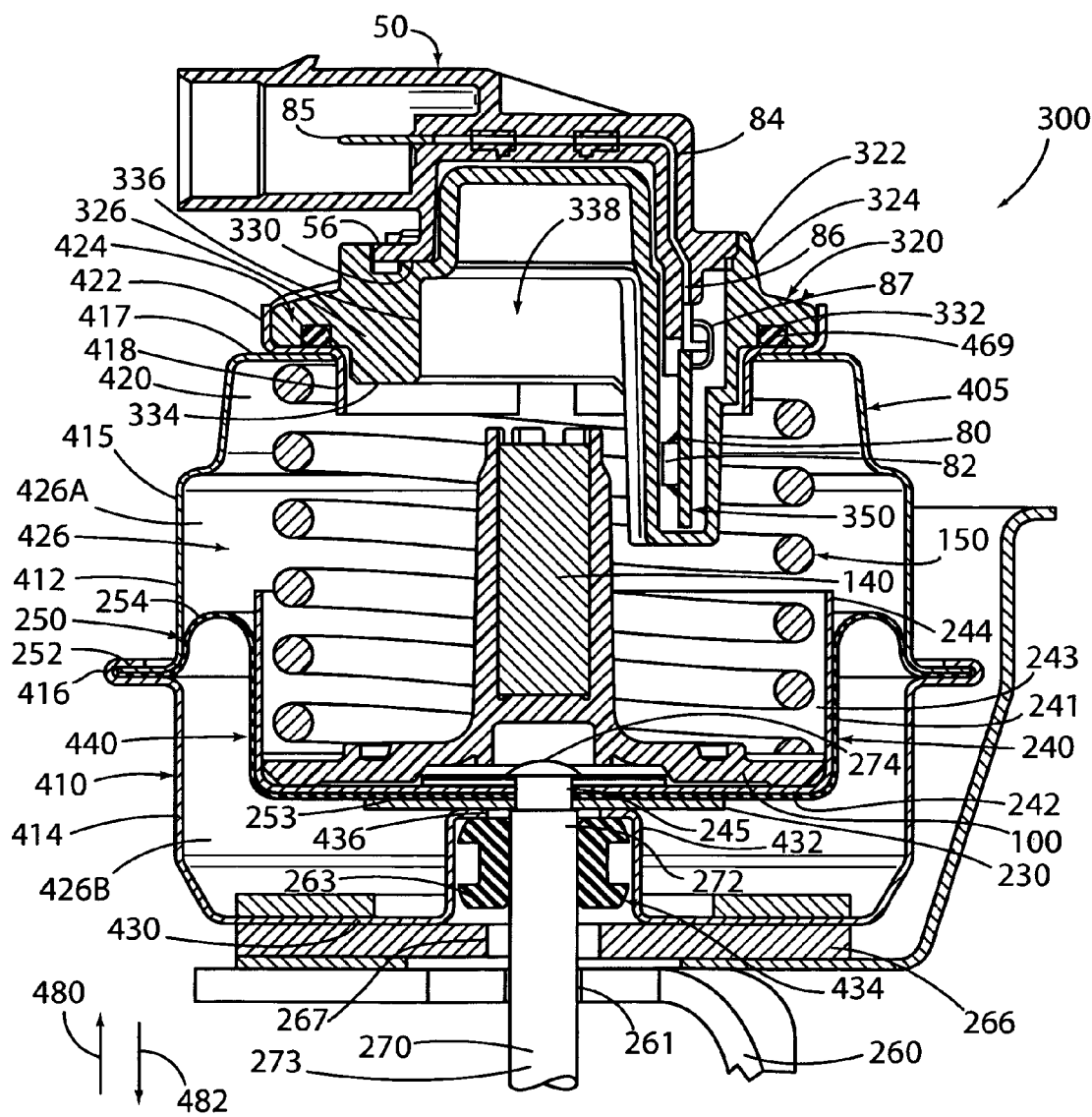
FIG. 10 is a vertical cross-sectional view of the linear position sensor of FIG. 9 assembled with an actuator.

Another embodiment of a linear position sensor assembly 320 in accordance with the present invention is shown in FIGS. 9 and 10. Linear position sensor 320 can sense the position of a moveable object that travels in a linear manner. Linear position sensor 320 includes a housing 322, a magnet carrier 100, and a spring 150 that biases the magnet carrier 100 away from housing 322. Linear position sensor assembly 320 is adapted to be mounted to an actuator 405 (FIG. 10) that has an actuator housing 410 (FIG. 10) which forms a pneumatic actuator and sensor assembly 300 (FIG. 10). Actuator housing 410 defines an internal cavity or chamber or compartment or pocket 426.

A generally rounded housing or cover 322 defines a connector portion 50 and a bottom flange portion 324. In one embodiment, housing 322 can be formed from injected molded plastic.

Bottom portion 324 comprises a circular body 326 having a radial extending rim 328. Body 326 defines an upwardly facing circumferential recess 330 and a downwardly facing circumferential slot 332. Body 326 and recess 330 define a circumferentially peripheral upwardly extending rim 333. Shoulder 334 extends downwardly from body 326.

Body 326 has an inner surface or wall 336 that defines an interior cavity or bore 338. Housing portion 324 further comprises a rounded, closed top portion or roof 340. Bore 338 extends into the interior of top portion 340.

Wall 344 extends downwardly from top portion 340 and further defines one side of bore 338. Bore 338 is connected and co-axial with interior cavity 426. Walls 345 and 346 are joined with wall 344 and define a printed circuit board cavity or chamber or compartment or pocket 350 in housing or cover 322.

Housing 322 further comprises connector portion 50 mounted over top portion 340. Connector portion 50 includes a body 51 and a shroud 52 that extends from body 51. Body 51 defines an interior cavity 57. A second cavity 53 is defined inside shroud 52 and a locking tab 54 is located on an exterior surface of shroud 52. An electrical connector (not shown) is adapted to be mounted over shroud 52 and retained to the shroud 52 by locking tab 54. The electrical connector may be connected with a wire harness.

Connector portion 50 further comprises a flange 56 that extends radially outwardly from body 51. Flange 56 is seated in recess 330 of housing 322. Connector portion 50 can be attached to bottom portion 324 of housing 322 by heat staking or ultrasonically welding the flange 56 and the rim 333 together. Top portion 340 fits into cavity 57 of connector 50. Connector portion 50 has an arm 58 that extends downwardly into printed circuit board pocket 350.

Several electrically conductive L-shaped terminals 84 can be insert-molded into body 51. Terminals 84 are retained by, and pass through, body 51. Terminals 84 define respective opposed ends 85 and 86. Terminal end 86 extends into board pocket 350 and can be attached to printed circuit board 80 by a wire bond 87. One end of wire bond 87 is electrically connected to terminal end 86 and the other end is electrically connected to a printed circuit line 83 on circuit board 80. Printed circuit board 80 may include plated through holes for making electrical connections form one side of the circuit board to another side of the circuit board. Terminal end 85 extends into connector cavity 53. Terminal end 85 can be connected with an electrical connector (not shown).

Printed circuit board 80 is mounted in printed circuit board pocket 350. Printed circuit board 80 can be a conventional printed circuit board that has printed circuit lines as is known in the art. A sensor 82 is mounted to printed circuit board 80. Sensor 82 can be a magnetic field sensor of the type described earlier with respect to the FIG. 2 embodiment.

Magnet carrier 100 is mounted for motion within cavity 426 and bore 338. Magnet carrier 100 has a radial base 102. Base 102 has a top portion or face 104 and a bottom or face portion 106. Magnet carrier 100 further comprises an elongate tube 120 that extends centrally upwardly from the top portion 104 of base 102. Tube 120 is defined by a cylindrical wall 122 that has an inside surface 124 and an outside surface 126. Tube 120 defines an interior magnet bore 130. A counter bore 132 is defined in base 102 and faces outwardly from bottom portion 106. Counter bore 132 is defined by a wall 134.

A magnet 140 can be mounted in magnet bore 130. Magnet 140 can be inserted into magnet bore 130 and held in place with a heat stake 112. Alternatively, magnet 140 may be press fitted into magnet bore 130.

Magnet 140 can be a permanent magnet that is polarized to define a north pole 141 and a south pole 142. Magnet 140 can be made from several different magnetic materials such as, but not limited to, ferrite or samarium cobalt or neodymium-iron-boron. In one embodiment, magnet 140 can be a neodymium-iron boron magnet that is cylindrical in shape. Other types and shapes of magnets may also be used.

Coil spring 150 is disposed within cavity 426 between actuator housing 410 at one end and magnet carrier 100 at the other end. Coil spring 150 has ends 152 and 154. End 152 rests against top interior housing wall 417 within annular recess 420 and end 154 rests on top surface 104 of magnet carrier 100. Spring 150 biases magnet carrier 100 away from housing 410. Spring 150 surrounds the tube 120 of magnet carrier 100 as well as the pocket 350 defined by housing 322. The pocket 350 is thus located in chamber 426 between the tube 120 and the spring 150.

A pneumatic actuator assembly 300 comprises the linear position sensor 320 mounted to an actuator housing 410 and a piston or plunger 440.

Actuator housing 410 is circular in shape and includes an upper housing portion 412 and a bottom housing portion 414 that are joined together by a crimp 416. Upper housing portion 412 and bottom housing portion 414 can be formed from stamped sheet metal. Edges of the sheet metal can be rolled to form crimp 416. Actuator housing 410 defines an internal cavity or chamber or compartment or pocket 426 that includes an upper chamber or pocket 426A and a lower chamber or pocket 426B.

Top housing portion 412 has an outer circumferential wall 415 that extends upwardly from crimp 416 to a top radial wall 417 that is bent downwardly into cavity 426 forming a circular wall 418 within cavity 426. Wall 415, top wall 417, and circular wall 418 define a recess or space 420 that is co-extensive with cavity 426.

A circular metal wall 422 has an L-shaped cross-section and is mounted to top wall 417 by spot welding. L-shaped wall 422 defines a recess 424.

Lower housing portion 414 has a bottom wall 430 from which a barrel-shaped boss 432 extends upwardly. Boss 432 defines a recess 434 and an aperture 436 extends through boss 432.

A piston or plunger 240 is disposed within cavity 426B. Piston 240 has a side circumferential wall 241 including an interior surface 243, an outer surface 244, and a bottom radial wall 242. An aperture 245 is formed in bottom wall 242. Piston 240 is adapted for movement within cavity 426B.

A circular plate 230 is mounted adjacent to and below bottom wall 242. An aperture 232 is defined in and extends through the center of plate 232.

Bracket 260 defines a central aperture 261. Bracket 260 can be fastened to a vehicle engine (not shown). A bearing 263 is located in recess 434 and supports shaft 270. A plate 266 is mounted between bracket 260 and housing 414. Plate 266 defines a central aperture 267. Bracket 260 supports lower actuator housing 414. Lower actuator housing 414 can be connected to plate 266 and bracket 260 by spot welding or by the use of fasteners.

Shaft 270 defines opposed ends 272 and 273. A mushroom-shaped crown 274 is defined at end 272. Shaft 270 can be attached to any type of object. For example, shaft 270 may be attached to a bypass or waste gate valve of a turbocharger that is attached to an engine.

Shaft 270 extends successively through aperture 261, aperture 267, bearing 263, aperture 436 and aperture 245 and partially into counter bore 132. Crown 274 has a larger diameter than aperture 245 thereby retaining crown piston or plunger 240 to shaft 270.

Flexible rubber boot 250 is generally circular in shape and defines an outer edge 252, a central aperture 253, and a flexible section 254. Flexible rubber boot 250 can be formed from a wide variety of flexible or resilient materials such as, for example, rubber or plastic and is coupled to and supports piston 240. Flexible rubber boot 250 surrounds side wall 241 and bottom wall 242 and is further held between plate 230 and bottom wall 242. The outer edge 252 is held in crimp 416 between upper housing 412 and lower housing 414. Flexible rubber boot 250 allows piston 240 to move within cavity 426 and divides the cavity or chamber 426 into the two sealed cavities or chambers 426A and 426B. One or both cavities 426A and 426B can be connected to a source of vacuum or the like through a port or opening (not shown) in order to cause motion of piston 240 and shaft 270.

Linear position sensor 320 is mounted to actuator housing 410. Linear position sensor 320 is seated within circular metal wall 422 filling recess 424 and shoulder 334 extending into cavity 426A. An O-ring seal 469 is seated in slot 332 and is juxtaposed to top wall 417. Tab 428 is bent over bottom housing portion 324 compressing O-ring seal 469 between bottom housing portion 324 and top wall 417 thereby sealing chamber 426A. In this manner, linear position sensor 320 is retained to actuator 405.

Linear position sensor assembly 320 can be used to ascertain the position of a moveable object such as shaft 270 that is moved by actuator 405. Shaft 270 can be connected with a wide variety of objects including turbo-charger bypass or waste gate valves.

FIG. 10 depicts actuator and sensor assembly 300 with shaft 270 in a fully extended position. Cavities 426A and 426B can be connected to a source of vacuum of the type described earlier with respect to the FIG. 3 embodiment. When vacuum is decreased in cavity 426B and/or increased in cavity 426A, piston 240 is forced to move upwardly in direction 480, compressing spring 150 and retracting shaft 270. When vacuum is decreased in cavity 426A and/or increased in cavity 426B, piston 240 is forced to move downwardly in direction 482, releasing spring 150 and extending shaft 270.

At the same time that piston 240 is moving, magnet carrier 100 and magnet 140 are also moving linearly within cavity 426A and bore 338. Magnet 140 is moving in a linear manner with respect to Hall Effect sensor 82 that is fixed within printed circuit board pocket 350. Sensor 82 is located in housing pocket 350 and is spaced, and separated, from magnet 140 by wall 344 (FIG. 9). The magnetic field produced by magnet 140 passes through wall 344 where the magnitude and direction of the magnetic field is sensed by sensor 82. As magnet 140 moves linearly, north pole 141 and south pole 142 change position relative to sensor 82 thus creating a change in the magnitude and direction of the magnetic field. The changes in direction and magnitude of the magnetic field can be sensed about two axes by sensor 82.

Sensor 82 produces an electrical signal that changes in response to the position of magnet 140 and thereby also the position of shaft 270. The electrical signal produced by sensor 82 is indicative of the position of magnet 140 and piston 240. As the magnetic field generated by the magnet 140 varies with movement of the shaft, the electrical output signal produced by sensor 82 changes accordingly, allowing the position of shaft 270 to be determined. The electrical output signal produced by sensor 82 is carried or conducted by printed circuit lines 83 to wire bond 87 to terminal 84. Terminal 84 may then be connected with another electrical cable or wire harness (not shown) that is connected to connector 50.

Second Alternative Embodiment

Figure 11:
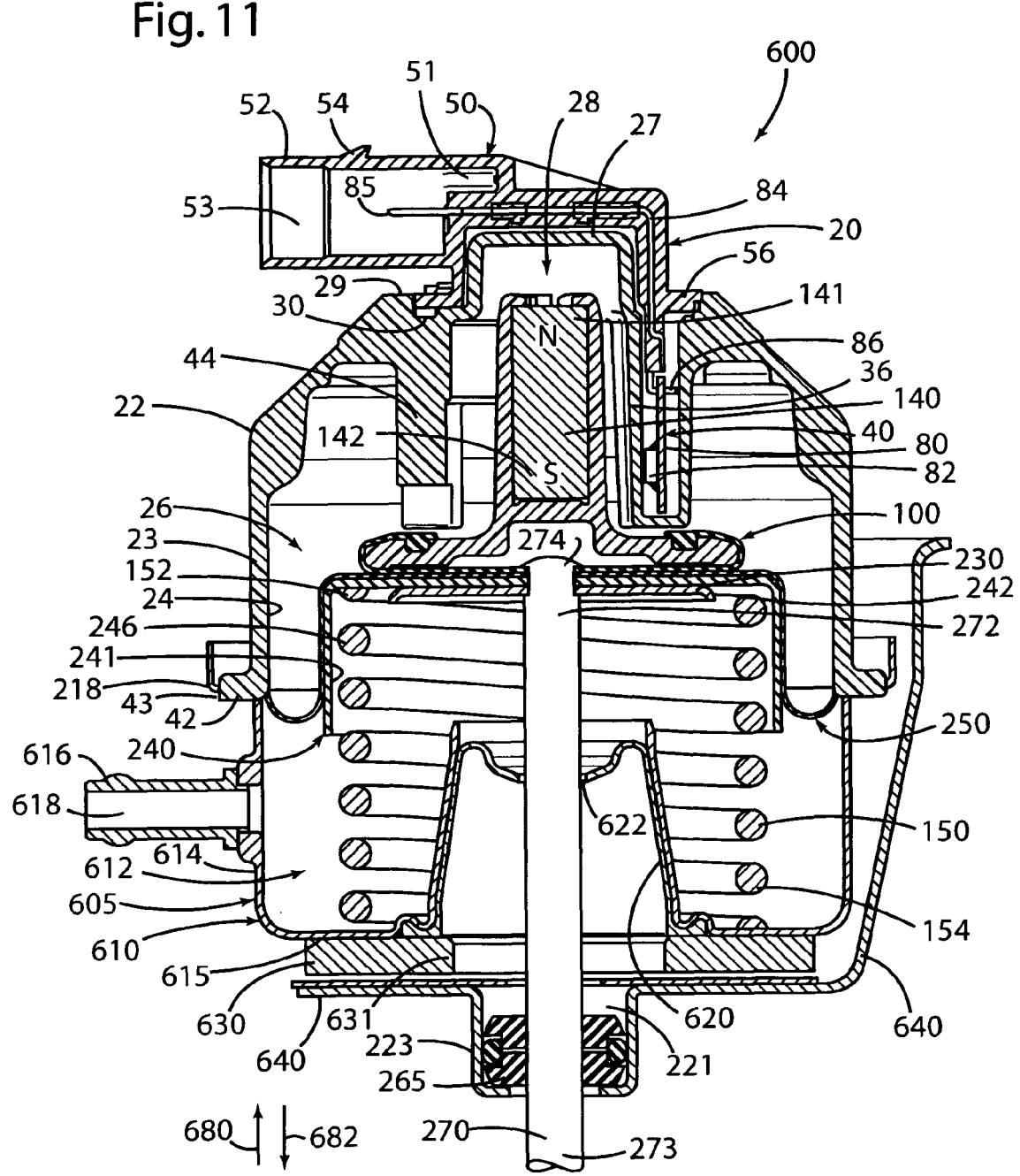
FIG. 11 is a vertical cross-sectional view of an additional embodiment of a linear position sensor assembled with an actuator in accordance with the present invention.

Another embodiment of an actuator and sensor assembly 600 in accordance with the present invention is shown in FIG. 11. Actuator and sensor assembly 600 is similar to actuator and sensor assembly 200 shown in FIG. 3, and the description of the various elements thereof is thus incorporated herein by reference, except that the direction of piston 240 and spring 150 have been reversed. Instead of biasing piston 240 away from linear position sensor 20, piston 240 is now biased toward linear position sensor 20.

Actuator and sensor assembly 600 comprises the previously described linear position sensor 20 mounted to a pneumatic actuator 605. Actuator 605 includes an actuator housing 610 having a circumferential side wall 614 and a bottom radial wall or floor 615. Walls 614 and 615 define an interior housing cavity or chamber or compartment or pocket 612. A tube 616 is connected to and extends radially away from the exterior of wall 614. Tube 616 defines a passage or port 618 through which air may be admitted or withdrawn.

Housing or cover 22 defines a printed circuit board cavity or pocket or compartment or chamber 40 as described earlier with the FIG. 3 embodiment and is retained to actuator housing 610 by crimping in sleeve 218. Flexible rubber boot 250 is also crimped into sleeve 218 between walls creating two sealed upper and lower chambers or cavities or pockets or compartments 26 and 612 respectively in housing 610.

Piston or plunger 240 is disposed within cavities 26 and 612. Piston 240 has a circumferential side wall 241 and a bottom wall or floor 242. Walls 241 and 242 define an interior recess or cavity 246. Recess 246 faces the bottom wall 615 of actuator housing 610. As previously described, shaft 270 is attached to piston 240.

Bottom wall 615 is turned inwardly into cavity 612 forming a generally cone-shaped tapered mandrel 620. Mandrel 620 defines a central aperture 622. Coil spring 150 is mounted over and surrounds mandrel 620. Coil spring 150 is compressed between piston 240 and housing bottom wall 615. Coil spring 150 has ends 152 and 154. End 152 is retained by housing wall 242 and end 154 is retained by and against housing bottom wall 615.

A sheet metal plate 630 is attached to housing bottom wall 615 by spot welding. Plate 630 defines a central aperture 631. A sheet metal outer shell 640 is attached to plate 630 by spot welding. A portion of outer shell 640 is formed to create boss 223. Bearing 265 is mounted within boss 223 for rotational support of end 273 of shaft 270. Outer shell 640 can be mounted to a bracket (not shown) that is fastened to a vehicle engine or engine component such as a turbocharger (not shown).

FIG. 11 depicts actuator and sensor assembly 600 with shaft 270 in a fully retracted position. Port 618 can be connected to a source of vacuum of the type described above with respect to the FIG. 6 embodiment. When the vacuum is decreased through port 618 into cavity 612, piston 240 is forced to move upwardly in direction 680, extending spring 150 and retracting shaft 270. When vacuum is increased through port 618 in cavity 612, piston 240 is forced to move downwardly in direction 682, compressing spring 150 and extending shaft 270.

At the same time that piston 240 is moving, magnet carrier 100 and magnet 140 are also moving linearly within cavity 26 and bore 28. Magnet 140 is moving in a linear manner with respect to Hall Effect sensor 82 that is fixed within printed circuit board cavity 40 which is defined in housing 22. Sensor 82 is located in separate housing pocket 40 and spaced, and separated, from magnet 140 by wall 36 of housing 22. The magnetic field produced by magnet 140 passes through wall 36 where the magnitude and direction of the magnetic field is sensed by sensor 82. As magnet 140 moves linearly, North Pole 141 and South Pole 142 change position relative to sensor 82 thus creating a change in the magnitude and direction of the magnetic field. The changes in direction and magnitude of the magnetic field can be sensed about two axes by sensor 82.

Sensor 82 produces an electrical signal that changes in response to the position of magnet 140 and thereby also the position of shaft 270. The electrical signal produced by sensor 82 is indicative of the position of magnet 140 and piston 240. As the magnetic field generated by the magnet 140 varies with movement of the shaft, the electrical output signal produced by sensor 82 changes accordingly, allowing the position of shaft 270 to be determined. The electrical output signal produced by sensor 82 is carried or conducted by printed circuit lines (not shown) for connection to terminal end 86. End 86 is connected to terminal 84 and end 85. Terminal end 85 may then be connected with another electrical cable or wire harness (not shown) that is connected to connector 50.

CONCLUSION

While the invention has been taught with specific reference to the embodiments shown, it is understood that a person of ordinary skill in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A sensor for sensing the linear position of a moveable object, comprising:
    a housing defining a longitudinal axis and first and second cavities;
    a wall separating the first and second cavities;
    at least one magnet positioned within the first cavity in a relationship generally co-linear with the longitudinal axis of the housing, the magnet generating a magnetic field having a magnitude and a direction, the magnet being adapted for movement in the first cavity in response to movement of the moveable object;
    at least one magnetic sensor positioned within the second cavity in a relationship spaced from the magnet and the longitudinal axis of the housing, the magnetic sensor sensing the magnitude and direction of the magnetic field generated by the magnet and generating an electrical signal that is indicative of the linear position of the magnet and the moveable object and, wherein the magnet is an elongated magnet adapted for movement in the first cavity of the housing in a variable horizontal spacing relationship relative to the sensor.

2. The sensor of claim 1, wherein a spring is located in the first cavity and surrounds both the sensor and the magnet, the wall separating the first and second cavities extending between the magnet and the spring.

3. The sensor of claim 1, wherein the magnetic sensor is an integrated circuit adapted to sense a change in the magnitude and direction of the magnetic field about two axes.

4. A sensor for sensing the linear movement of a moveable object, comprising:
    a magnet carrier adapted for movement and defining an interior elongated bore;
    an elongated magnet located in the interior elongated bore of the magnet carrier, the magnet generating a magnetic field and also adapted for movement; and
    a sensor opposed and spaced from the magnet and adapted to sense the magnetic field generated by the magnet, the horizontal spacing and distance between the sensor and the magnet being variable in response to the movement of the magnet.

5. The sensor according to claim 4, further comprising a housing defining first and second cavities, the magnet carrier being disposed in the first cavity and the sensor being disposed in the second cavity.

6. The sensor according to claim 4, wherein the housing includes a wall separating the magnet and the sensor.

7. The sensor of claim 6, further comprising a spring in the housing which surrounds the magnet carrier.

8. The sensor of claim 4, wherein the magnetic field generated by the magnet includes a magnitude and a direction and the sensor is an integrated circuit sensor adapted to sense a change in the magnitude and direction of the magnetic field resulting from movement of the magnet.

9. An actuator and sensor assembly, comprising:
    an actuator housing;
    a sensor assembly coupled to the actuator housing, the actuator housing and the sensor assembly together defining an interior cavity, the sensor assembly including an integrated circuit sensor; and
    a magnet adapted for movement in the actuator and sensor assembly and to produce a magnetic field with a magnitude and direction;
    the integrated circuit sensor being adapted to sense a change in the magnitude and direction of the magnetic field in response to the movement of the magnet and to determine the linear position of the magnet and, wherein the actuator and sensor assembly define a longitudinal axis, the magnet being positioned in a relationship generally co-linear with the longitudinal axis and the sensor being positioned in a spaced relationship from the longitudinal axis and the magnet and the spacing between the magnet and the sensor in a direction transverse to the longitudinal axis is variable in response to the movement of the magnet.

10. The assembly of claim 9, further comprising a magnet carrier located in and adapted for movement in the interior cavity, the magnet carrier including an elongate tube, the magnet being elongate and adapted for mounting in the elongate tube of the magnet carrier.

* * * * *